(12) United States Patent
Frid et al.

(10) Patent No.: US 11,682,889 B2
(45) Date of Patent: Jun. 20, 2023

(54) ELECTRICAL DEVICE WITH BUILT-IN SENSORS AND/OR COMMUNICATIONS

(71) Applicant: LEVITON MANUFACTURING CO., INC., Melville, NY (US)

(72) Inventors: Eugene Frid, Great Neck, NY (US); William Hagen, Hauppauge, NY (US); Ralph Rosa, Bohemia, NY (US); Jan Niewiadomski, Aquebogue, NY (US); Michael Calamita, Hampton Bays, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 16/695,921

(22) PCT Filed: Nov. 14, 2019

(86) PCT No.: PCT/US2019/061367
§ 371 (c)(1),
(2) Date: Nov. 26, 2019

(87) PCT Pub. No.: WO2020/146046
PCT Pub. Date: Jul. 16, 2020

(65) Prior Publication Data
US 2021/0167593 A1 Jun. 3, 2021

Related U.S. Application Data

(60) Provisional application No. 62/789,088, filed on Jan. 7, 2019.

(51) Int. Cl.
*H02H 1/00* (2006.01)
*G05B 23/02* (2006.01)
(Continued)

(52) U.S. Cl.
CPC ........... *H02H 1/0007* (2013.01); *G01N 27/06* (2013.01); *G05B 23/0221* (2013.01);
(Continued)

(58) Field of Classification Search
CPC ............ G05B 23/0221; G06F 13/4282; H02H 7/22–228; H02H 1/0007
See application file for complete search history.

(56) References Cited

U.S. PATENT DOCUMENTS

| 2,428,563 A | 10/1947 | Fountain |
| 2,660,717 A | 11/1953 | Hood |

(Continued)

FOREIGN PATENT DOCUMENTS

| WO | WO1990007787 | 7/1990 |
| WO | WO1993017390 | 9/1993 |

(Continued)

OTHER PUBLICATIONS

Use a three-phase rectifier and voltage reducer for offline single-phase supplies, dated Apr. 6, 2012.
(Continued)

*Primary Examiner* — Jared Fureman
*Assistant Examiner* — Christopher J Clark
(74) *Attorney, Agent, or Firm* — KDW Firm PLLC

(57) ABSTRACT

An electrical device such as, for example, a mechanical interlock including one or more interconnected electrical components configured to detect or monitor an operational state or condition is hereby disclosed. In one embodiment, the electrical device may include a communications bus, one or more sensor modules coupled to the communications bus, and a sensor hub module coupled to the communications bus, wherein the sensor module(s) generate signal(s) including data indicating a sensed condition. A communications module coupled to the sensor hub module may transmit the
(Continued)

data indicating the sensed condition to a remote device, a remote computer network, or a remote cloud service. Additionally, and/or alternatively, the device may include a water detection sensor including first and second curved conductive traces. Additionally, and/or alternatively, the device may include a voltage limiter circuit providing a DC output voltage from a high voltage AC input.

27 Claims, 6 Drawing Sheets

(51) Int. Cl.
*G06F 13/42* (2006.01)
*G01N 27/06* (2006.01)
*H02H 9/04* (2006.01)

(52) U.S. Cl.
CPC .......... *G06F 13/4282* (2013.01); *H02H 9/04* (2013.01); *G05B 2223/06* (2018.08); *G06F 2213/0016* (2013.01)

(56) References Cited

U.S. PATENT DOCUMENTS

| | | | |
|---|---|---|---|
| 2,698,879 A | | 1/1955 | Shepherd |
| 3,007,105 A | | 10/1961 | Klokow |
| 3,778,801 A | | 12/1973 | Nudelmont |
| 3,848,160 A | | 11/1974 | Boothman |
| 3,945,702 A | * | 3/1976 | Poliak .................. H01R 13/71 |
| | | | 439/337 |
| 4,111,516 A | | 9/1978 | Wireman |
| 4,298,864 A | | 11/1981 | Mahnke |
| 4,318,578 A | | 3/1982 | Ericson |
| 4,345,477 A | | 8/1982 | Johnson |
| 4,500,160 A | | 2/1985 | Bertsch |
| 4,606,597 A | | 8/1986 | Bielefeld |
| 4,671,597 A | | 6/1987 | Grill |
| 5,244,409 A | | 9/1993 | Guss |
| 5,297,015 A | | 3/1994 | Miyazaki |
| 5,409,398 A | | 4/1995 | Chadbourne |
| 5,544,089 A | | 8/1996 | Hemminger et al. |
| 5,555,508 A | | 9/1996 | Munday et al. |
| 5,567,175 A | | 10/1996 | Warden |
| 5,652,420 A | | 7/1997 | Innes et al. |
| 5,699,051 A | | 12/1997 | Billig |
| 5,971,597 A | | 10/1999 | Baldwin et al. |
| 5,973,594 A | | 10/1999 | Baldwin et al. |
| 6,285,912 B1 | | 9/2001 | Ellison et al. |
| 6,362,445 B1 | | 3/2002 | Marchand et al. |
| 6,380,911 B1 | | 4/2002 | Baton |
| 6,746,250 B2 | | 6/2004 | Blutbacher |
| 6,802,741 B1 | | 10/2004 | Shatkin |
| 6,827,602 B2 | | 12/2004 | Greene |
| 6,867,364 B2 | | 3/2005 | Hafskjold et al. |
| 7,086,892 B2 | | 8/2006 | Tanacan |
| 7,168,974 B2 | | 1/2007 | Feldman |
| 7,911,338 B2 | | 3/2011 | Naeve et al. |
| 8,305,737 B2 | | 11/2012 | Ewing et al. |
| 8,443,355 B2 | | 5/2013 | Wiese et al. |
| 8,935,435 B2 | | 1/2015 | Reidt |
| 9,673,614 B2 | | 6/2017 | Westerlund |
| 9,792,805 B2 | | 10/2017 | Itzler et al. |
| 9,819,226 B2 | | 11/2017 | Yang et al. |
| 9,858,796 B2 | | 1/2018 | Ricciuti |
| 10,147,301 B2 | | 12/2018 | Itzler et al. |
| 2006/0040546 A1 | | 2/2006 | Werthman |
| 2007/0164751 A1 | | 7/2007 | Parachini et al. |
| 2009/0207753 A1 | | 8/2009 | Bieganski |
| 2009/0210178 A1 | | 8/2009 | Bieganski |
| 2011/0119507 A1 | | 5/2011 | Reidt |
| 2012/0275084 A1 | | 11/2012 | Familiant et al. |
| 2013/0323940 A1 | * | 12/2013 | Coffey ............... H01R 13/6205 |
| | | | 385/139 |
| 2014/0015317 A1 | | 1/2014 | Ewing et al. |
| 2014/0139454 A1 | | 5/2014 | Mistry et al. |
| 2015/0151960 A1 | * | 6/2015 | McCleland ......... G06F 13/4282 |
| | | | 73/865.8 |
| 2015/0192619 A1 | | 7/2015 | Javora et al. |
| 2015/0348580 A1 | | 12/2015 | van Hoff et al. |
| 2016/0156225 A1 | | 6/2016 | Yang et al. |
| 2016/0261106 A1 | | 9/2016 | Westerlund |
| 2016/0343232 A1 | * | 11/2016 | Itzler ........................ H02J 3/12 |
| 2017/0068267 A1 | | 3/2017 | El-Gayyar |
| 2017/0110875 A1 | * | 4/2017 | Schweitzer, III .... G01R 31/085 |
| 2017/0184674 A1 | | 6/2017 | Okerman |
| 2017/0193793 A1 | | 7/2017 | Ricciuti |
| 2017/0270769 A1 | | 9/2017 | Itzler et al. |

FOREIGN PATENT DOCUMENTS

| | | |
|---|---|---|
| WO | WO1995029526 | 11/1995 |
| WO | WO2001050561 | 7/2001 |
| WO | WO2002035494 | 5/2002 |
| WO | WO2002035495 | 5/2002 |
| WO | WQ2002041336 | 5/2002 |
| WO | WO2005039111 | 4/2005 |
| WO | WO2008007160 | 1/2008 |
| WO | WO2009016472 | 2/2009 |
| WO | WO2011018106 | 2/2011 |
| WO | WO2012148897 | 11/2012 |
| WO | WO2014044408 | 3/2014 |
| WO | WO2915055233 | 4/2015 |
| WO | WO2916149369 | 9/2016 |

OTHER PUBLICATIONS

Packet Power, Spark Digital Expands Power Monitoring in Their Data Centers with Packet Power, Jul. 2015.
Packet Power, Smart Power Cables, Mar. 2018.
Packet Power, Fujitsu Data Center London, UK, Mar. 2016.
International Search Report and Written Opinion for the International Patent Application No. PCT/US2019/061367 dated Mar. 5, 2020, 10 pages.
Use a three-phase rectifier and voltage reducer for offline single-phase supplies, EDN Network.
Hubbell—Pin & Sleeve Switched Connectors Drawing (M-12537).
Hubbell—Switched in Pin & Sleeve Connectors (Installation Instructions).
Hubbell—Advantage Series Switch-Rated IEC Pin and Sleeve Brochure.

* cited by examiner

ELECTRICAL DEVICE WITH BUILT-IN SENSORS AND/OR COMMUNICATIONS

CROSS-REFERENCE TO RELATED APPLICATIONS

This application is a United States National Phase filing of International Application No. PCT/US2019/061367, filed Nov. 14, 2019, which is a non-provisional of, and claims the benefit of the filing date of, U.S. provisional patent application No. 62/789,088, filed Jan. 7, 2019, entitled "Electrical Device with Built-in Sensors and/or Communications," which applications are incorporated in their entirety by reference herein.

FIELD OF THE DISCLOSURE

The present disclosure relates generally to electrical devices and, more particularly, to mechanical interlocks containing interconnected electrical components to facilitate remote monitoring.

BACKGROUND OF THE DISCLOSURE

Electrical devices, such as mechanical interlocks, are often used in industrial applications to selectively couple devices to power sources. Mechanical interlocks typically operate in harsh conditions such as wet, dusty, or corrosive environments. As a result, mechanical interlocks, and any device coupled thereto, require frequent manual inspection and maintenance to ensure operation in a safe and effective manner. In many instances, maintenance problems are not detected until after damage has occurred. Further, routine manual inspections require a significant investment in man-hours.

Thus, it would be desirable to provide an electrical switch such as, for example, a mechanical interlock, having components that can monitor operating conditions of the device, or any device coupled thereto, while also being connected to remote devices, thereby providing remote monitoring of the device (e.g., mechanical interlock) to facilitate more efficient preventative maintenance.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, disclosed herein is an electrical device for supplying line-voltage power to a downstream coupled device. The electrical device including a communications bus, a sensor module coupled to the communications bus, and a sensor hub module coupled to the communications bus, wherein the sensor module generates a signal including data indicating a sensed condition, wherein the sensor module transmits the generated signal to the sensor hub module over the communications bus. The sensor hub module receives and processes the generated signal from the sensor module. The sensor hub module may control operation of the sensor module based on the data indicating the sensed condition. The sensor hub module may transmit the data indicating the sensed condition to a communications module of the electrical device. The communications module may transmit the data indicating the sensed condition to a remote device, a remote computer network, or a remote cloud service. The sensor hub module may receive a remote signal from the remote device, the remote computer network, or the remote cloud service through the communications module and may control operation of the sensor module based on the received remote signal.

In one embodiment, disclosed herein is a water detection sensor including a first curved conductive trace and a second curved conductive trace. The water detection sensor may include a resistance detection component coupled to the first and second curved conductive traces. The resistance detection component may detect a change in a resistance value between the first and second curved conductive traces, corresponding to an amount of water bridging a gap between the first and second curved conductive traces. The resistance detection component may provide an alert when change in the resistance value is detected.

In one embodiment, disclosed herein is a voltage limiter circuit including an input interface coupled to an AC input voltage, an output interface including an output capacitor coupled between a first output connection and second output connection, and a switching transistor coupled to the output capacitor, wherein the switching transistor turns on to charge the output capacitor to a threshold voltage level and turns off when the output capacitor is charged above the threshold voltage level, wherein the threshold voltage level corresponds to a DC output voltage. The DC output voltage can be equal to or less than a maximum output voltage. The input interface may be a single-phase input, a two-phase input, or a three-phase input and may include or may not include a neutral input.

BRIEF DESCRIPTION OF THE DRAWINGS

By way of example, specific embodiments of the disclosed device will now be described, with reference to the accompanying drawings, in which:

FIG. 1A illustrates an exploded, perspective view of an example embodiment of a mechanical interlock that the features of the present disclosure may be used in combination with;

FIG. 1B illustrates a front, perspective view of an example embodiment of a disconnect switch that the features of the present disclosure may be used in combination with;

FIG. 1C illustrates various perspective views of example embodiments of pin and sleeve devices that the features of the present disclosure may be used in combination with;

FIG. 1D illustrates a rear, perspective view of an example embodiment of an inlet that the features of the present disclosure may be used in combination with;

DETAILED DESCRIPTION

Figure 1A:
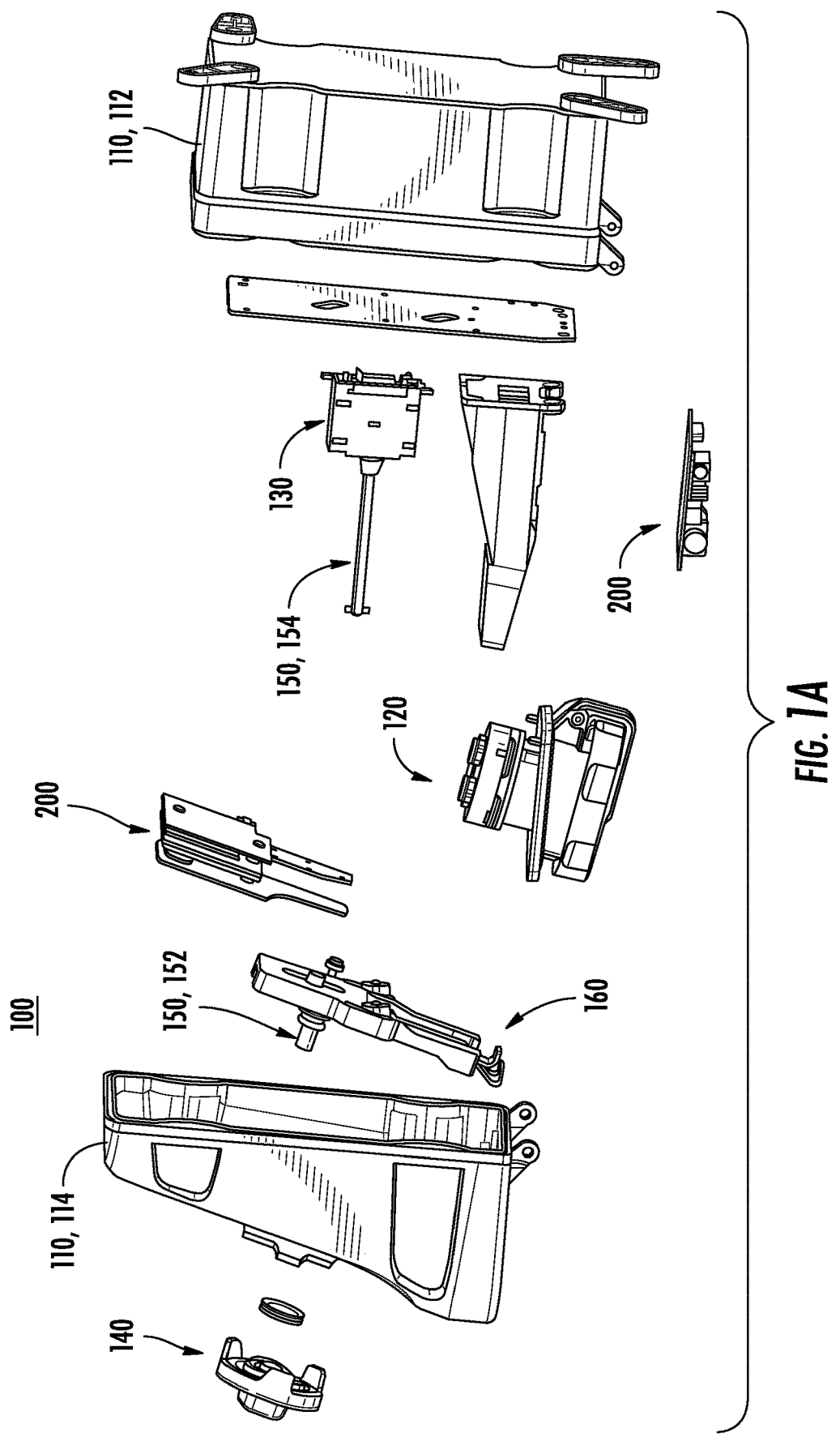

A device, system, and method in accordance with the present disclosure will now be described more fully hereinafter with reference to the accompanying drawings, in which example embodiments of the device, system, and method are shown. The disclosed device, system, and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

As will be described herein, the features according to the present disclosure may be used with any suitable electrical device now known or hereafter developed. For example, the electrical device may be in the form of, for example, a mechanical interlock 100 (FIG. 1A), a disconnect switch 170 (FIG. 1B), a pin and sleeve device 180 including a plug device 182 and a receptacle or connector 184 (FIG. 1C), an inlet 190 (FIG. 1D), a rotatably actuatable switch, or the like. The electrical device may be used in a variety of industrial or commercial applications, both indoors and outdoors, and may be used to energize and/or de-energize a downstream electrical device, such as machinery, motors, lights, fans, pumps, generators and the like. As such, specific details regarding construction and operation of the electrical device are omitted for sake of brevity of the present disclosure. In addition, the present disclosure should not be limited to the details of the electrical device, such as, for example, the mechanical interlock disclosed and illustrated herein, unless specifically claimed and that any suitable electrical device can be used in connection with the principles of the present disclosure.

As will be described now in connection with FIG. 1A, the electrical device may be in the form of a mechanical interlock. As will be appreciated by one of ordinary skill in the art, a mechanical interlock can be used to supply power to connected devices via, for example, a pin and sleeve device such as, for example, a plug such as plug device 182 shown in FIG. 1C. That is, for example, a plug can be connected to the mechanical interlock for selectively supplying power to a downstream electrical device. Mechanical interlocks are often designed for use in harsh or high abuse environments such as, for example, wet, dusty, or corrosive environments.

Referring to FIG. 1A, the illustrated embodiment of the mechanical interlock 100 includes a number of components including, inter alia, an enclosure 110, a connector 120 for coupling to, for example, a plug (not shown), an internal load switch 130, an external handle assembly 140, and a shaft 150 for rotationally coupling the external handle assembly 140 to the internal load switch 130. The mechanical interlock 100 may also include a number of other electrical and mechanical components.

As will be appreciated by one of ordinary skill in the art, the mechanical interlock 100 may receive power through one or more power input lines (not shown) and may supply power to, for example, a plug coupled to the connector 120. The external handle assembly 140 is typically mounted on a front of the enclosure 110 and may be connected to the load switch 130 through, for example, the shaft 150 to operate the actuating mechanism of the load switch 130. In use, the external handle assembly 140 may be rotationally locked to the load switch 130 via the shaft 150. Thus arranged, rotational movement of the handle assembly 140 causes the shaft 150 to rotate, which in turn rotates the load switch 130 to selectively supply and disconnect power from the connector 120, and hence the plug and the downstream electrical device.

In the illustrated embodiment, the shaft 150 may be in the form of a two-piece shaft so that the external handle assembly 140 may be operatively coupled to a handle portion or shaft 152 and the load switch 130 may be coupled to a switch portion or shaft 154, the handle portion or shaft 152 may be rotationally coupled to the switch portion or shaft 154 so that rotation of the external handle assembly 140 rotates the handle portion or shaft 152, which rotates the switch portion or shaft 154, which rotates/actuates the load switch 130 (portion and shaft used interchangeably herein without the intent to limit).

As illustrated, the enclosure 110 may be made up of a rear housing portion or base 112 and a front housing portion or cover 114, although it is envisioned that the enclosure 110 may be manufactured from more or less portions. In addition, the enclosure 110 may be manufactured from any suitable material including, for example, plastic, metal, or the like.

In use, the downstream electrical device may be energized or de-energized, depending on the direction of rotation of the handle assembly 140. Accordingly, the mechanical interlock 100 is "ON" (e.g., supplying power to the connected, downstream electrical device) when the plug is coupled to the connector 120 and the handle assembly 140 is in an "ON" position. When the handle assembly 140 is moved to an "OFF" position, the actuating mechanism of the load switch 130 will have been moved to open the contacts, so that power to the associated electrical device is disconnected. In general, the handle assembly 140 is rotated ninety-degrees to transition the mechanical interlock 100 between the ON and OFF positions.

As illustrated, in one example embodiment, the mechanical interlock 100 may also include an interlock latch assembly 160. In use, the interlock latch assembly 160 is selectively movable between a first position and a second position. The interlock latch assembly 160 is arranged and configured to be operatively associated with the connector 120 and the external handle assembly 140 so that when the interlock latch assembly 160 is in the first position, the interlock latch assembly 160 prevents rotation of the external handle assembly 140, and when the interlock latch assembly 160 is in the second position, the interlock latch assembly 160 permits rotation of the external handle assembly 140. In one embodiment, the interlock latch assembly 160 is movable between the first position and the second position via insertion of the plug into the connector 120. That is, insertion of the plug into the connector 120 contacts and moves the interlock latch assembly 160 from the first position to the second position. Additional information regarding the operation and construction of the mechanical interlock is hereby omitted for sake of brevity. For additional general information on mechanical interlocks, reference is hereby made to U.S. Provisional Patent Application No. 62/769,733, filed on Nov. 20, 2018, entitled Mechanical Interlocks with Enhanced Features and U.S. Provisional Patent Application No. 62/777,328, filed on Dec. 10, 2018, entitled Mechanical Interlocks with Enhanced Features, the contents of which applications is hereby incorporated by reference in their entirety.

Once again, however, it should be understood that the features according to the present disclosure may be used with any suitable electrical device and/or mechanical interlock now known or hereafter developed. In this regard, the present disclosure should not be limited to any specific mechanical interlock unless specifically claimed.

Figure 2:
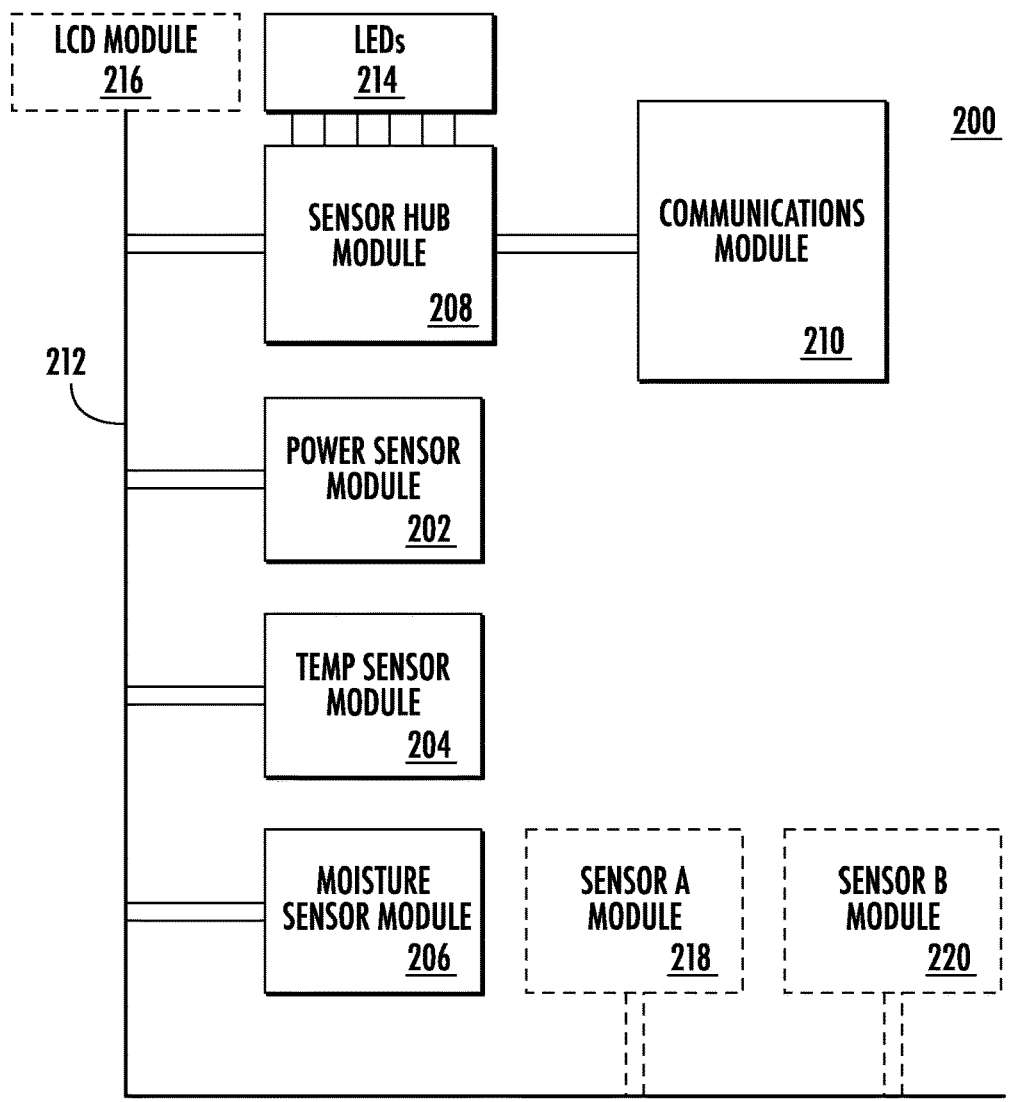
FIG. 2 illustrates a block diagram of an example embodiment of an architecture enabling interconnection of components of a device operating within an industrial environment in accordance with one aspect of the present disclosure.

FIG. 2 illustrates a block diagram of an example embodiment of an architecture 200 enabling interconnection of components of a device operating within an industrial environment. The architecture 200 further enables the components of the device to connect to a remote computer network, a remote device, a remote cloud service or platform, and/or the Internet. The architecture 200 may represent connections between components mounted on one or more printed circuit boards (PCB).

Figure 1B:
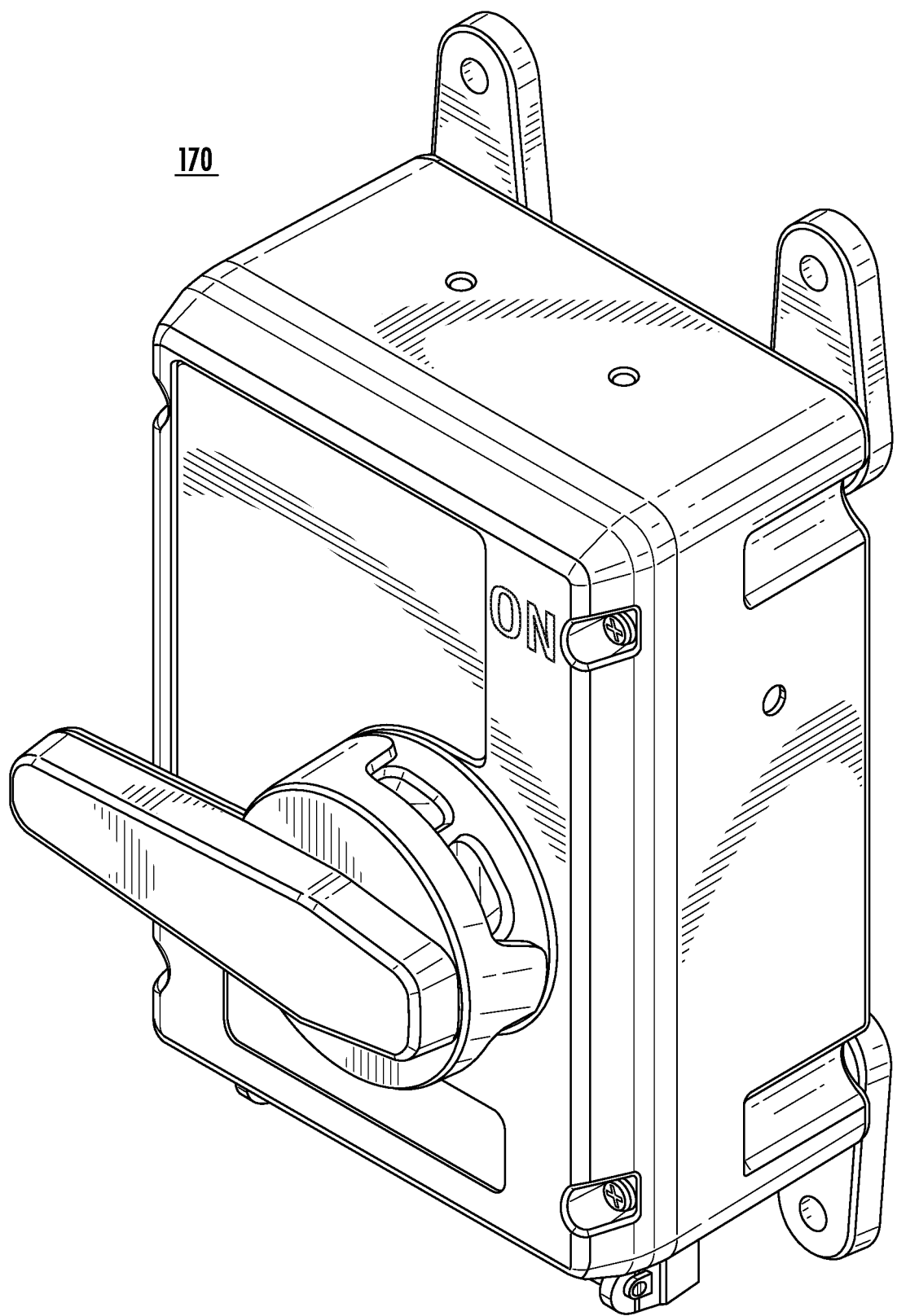
Figure 1C:
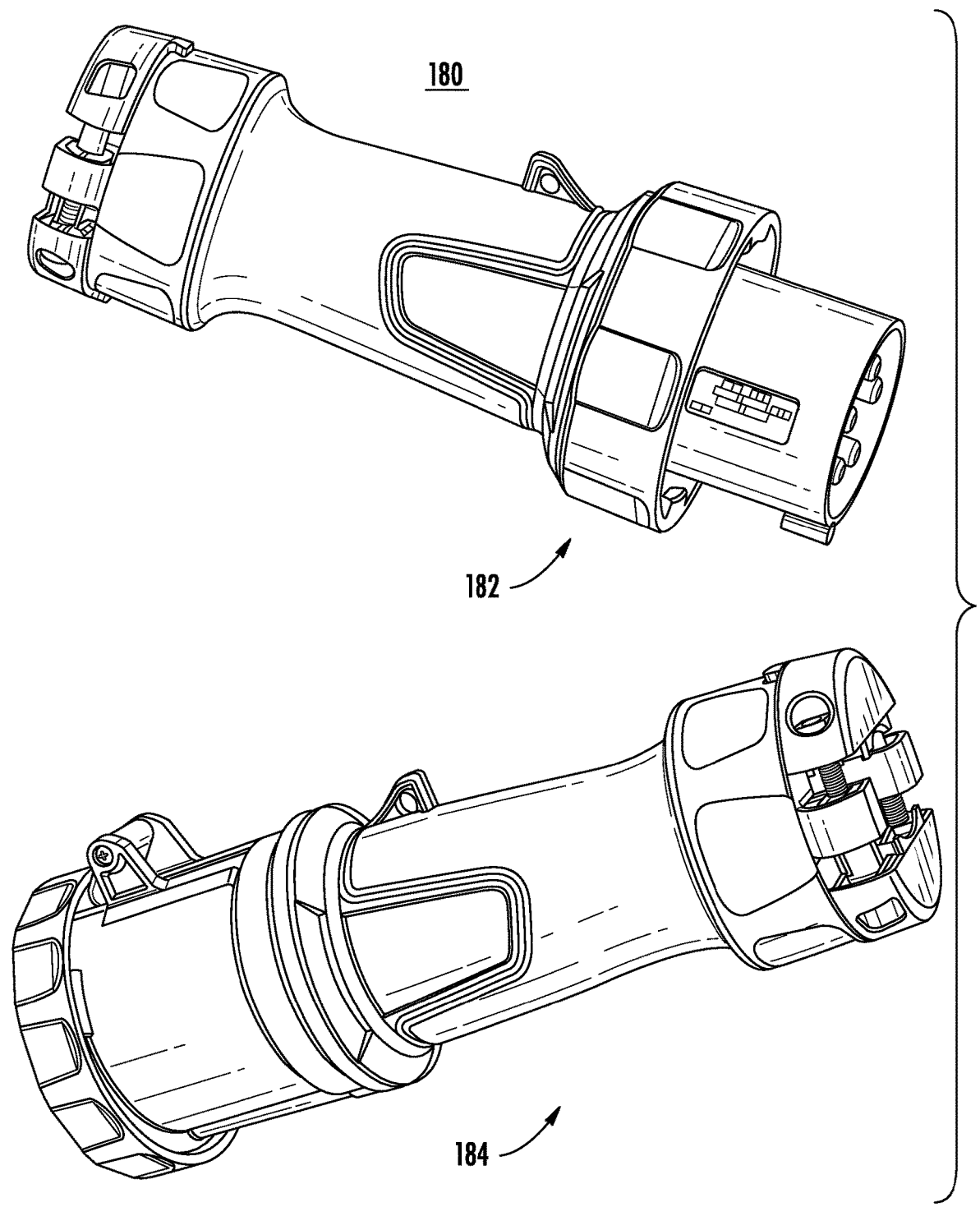
Figure 1D:
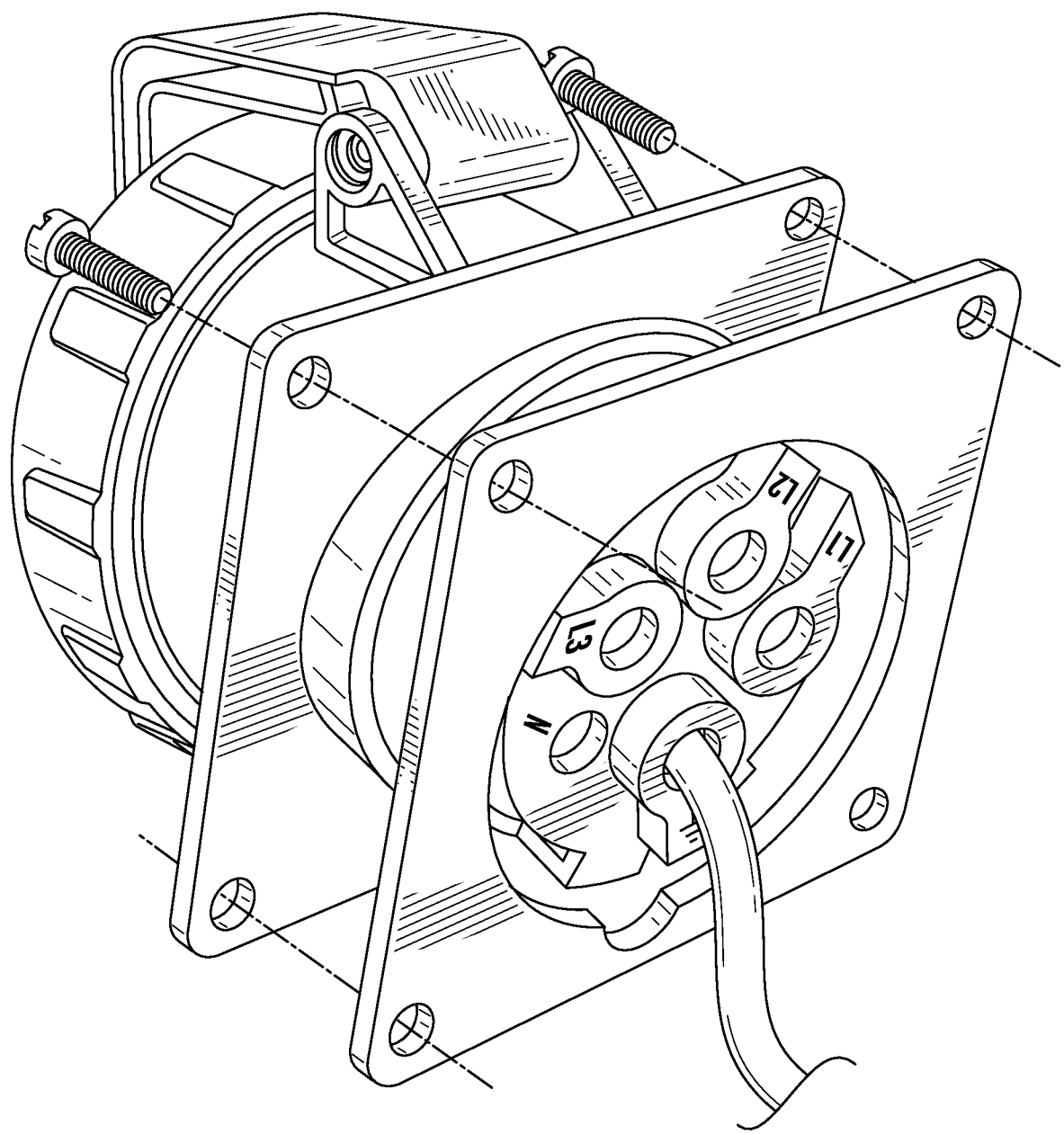

The architecture 200 may be provided in any type of electrical device including, but not limited to, the mechanical interlock illustrated and described in connection with FIG. 1A, the disconnect switch 170 illustrated in FIG. 1B, the pin and sleeve devices 180 illustrated in FIG. 1C, and the inlet 190 illustrated in FIG. 1D.

The architecture 200 provides a unified and scalable approach for adding or removing electrical components that may operate within or as part of the electrical device (e.g., mechanical interlock, etc.). The architecture 200 provides connectivity to any type of constituent electrical component such as, for example, a sensor that may collect data that may be analyzed to facilitate predictive maintenance and improved performance of the electrical device (e.g., mechanical interlock, etc.) and/or any other device coupled thereto. In one embodiment, the architecture 200 can be provided within an electrical device (e.g., a mechanical interlock, etc.) that is configured to operate in a three-phase Delta configuration. In another embodiment, the architecture 200 can be provided within an electrical device (e.g., a mechanical interlock, etc.) that is configured to operate in a three-phase Wye configuration.

As shown in FIG. 2, the architecture 200 may include a power sensor module 202, a temperature sensor module 204, a moisture sensor module 206, a sensor hub module 208, and a communications module 210. The power sensor module 202 may detect a condition or operational state of a power connection and/or a ground connection to the electrical device (e.g., mechanical interlock, etc.). For example, the power sensor module 202 may monitor power and ground continuity, power loss, or other disruptions in power line connections provided to the electrical device (e.g., mechanical interlock, etc.) or provided by the electrical device (e.g., mechanical interlock, etc.).

The temperature sensor module 204 may detect a temperature of the electrical device (e.g., mechanical interlock, etc.) and/or a temperature of an operating environment of the electrical device (e.g., mechanical interlock, etc.). The moisture sensor module 206 may detect an amount of moisture within the electrical device (e.g., mechanical interlock, etc.) and/or within the operating environment of the electrical device (e.g., mechanical interlock, etc.).

The sensor hub module 208 may be any type of controller, processor, or logic device including, for example, any programmable logic device (PLD), application specific integrated circuit (ASIC), general purpose processor, or logic circuitry. In one embodiment, the sensor hub module 208 may be a microcontroller unit (MCU) such as, for example, an STMicroelectronics STM8L ultra-low-power MCU. In another embodiment, the sensor hub module 208 may be a STMicroelectronics STM32 MCU.

The power sensor module 202, the temperature sensor module 204, the moisture sensor module 206, and the sensor hub module 208 may be interconnected by a communications bus 212. The communications bus 212 enables data or other communications to be transmitted between the power sensor module 202, the temperature sensor module 204, the moisture sensor module 206, and the sensor hub module 208. For example, data generated by the power sensor module 202 may be transmitted to the sensor hub module 208 over the communications bus 212. In one embodiment, the communications bus 208 may be a 2-wire isolated serial bus configured and/or operating according to the Inter-Integrated Circuit (I2C) protocol. In general, the communications bus 212 may provide connectivity with a reduced number of wires that isolates low voltage components of the architecture 200.

Each sensor within the architecture 200—for example, each of the power sensor module 202, the temperature sensor module 204, and the moisture sensor module 206—may generate a signal indicative of detected conditions or collected data and may transmit the generated signal to the sensor hub module 208. The sensor hub module 208 may then receive and process the signals. The sensor hub module 208 may then process and/or analyze any data provided in a signal provided by a sensor of the architecture 200. The sensor hub module 208 may adjust or control operation of any component of the architecture 200 or any other component coupled to the sensor hub module 208 based on the information provided by the received signals.

As an example, the sensor hub module 208 may transmit control instructions or other information to the power sensor module 212 based on data provided to the sensor hub module 208 from the power sensor module 212. Similarly, the temperature sensor module 204 and the moisture sensor module 206 may interact with the sensor hub module 208 to exchange data or other information. In this way, data generated by any of the power sensor module 202, the temperature sensor module 204, and the moisture sensor module 206 may be provided to the sensor hub module 208 and the sensor hub module 208 may direct operation of any of the power sensor module 202, the temperature sensor module 204, or the moisture sensor module 206.

The sensor hub module 208 may provide processed data to the communications module 210. The communications module 210 may transmit any information or data received from the sensor hub module 208 to any remote device, remote computer network, or remote cloud service or platform. The communications module 210 may provide a wired communications interface operating according to any known wired communication standard or protocol. The communications module 210 may also or alternatively provide a wireless communications interface operating according to any known wireless communications standard or protocol. In one embodiment, the communications module 210 may be a Wi-Fi module such as, for example, a Cypress CYW43907 Wi-Fi module. In one embodiment, the sensor hub module 208 and the communications module 210 may communicate over a universal asynchronous receiver-transmitter (UART) connection.

The communications module 210 allows data or other information provided to the sensor hub module 208 by the power sensor module 202, the temperature sensor module 204, or the moisture sensor module 206 to be offloaded for processing or analysis. Further, the communications module 210 allows data or other information (e.g., control instructions) from a remote device to be received and provided to the sensor hub module 208. The sensor hub module 208 may then direct operation of the power sensor module 202, the temperature sensor module 204, and the moisture sensor module 206 or any other constituent component of the electrical device (e.g., mechanical interlock, etc.) coupled to the communications bus 212 based on data received from a remote device or network.

The architecture 200 allows the sensor hub module 208 to receive data from any number of components coupled to the communications bus 212. Further, the architecture 200 allows data provided to the sensor hub module 208 to be transmitted remotely to enable remote monitoring of the electrical device (e.g., mechanical interlock, etc.). An operational state of the electrical device (e.g., mechanical interlock, etc.) may be determined by a remote device based on the provided data. Preventive maintenance of the electrical device (e.g., mechanical interlock, etc.) may then be provided based on knowledge of the operating state of the electrical device (e.g., mechanical interlock, etc.). The architecture 200 also allows remote data or other remote communications to be received by the sensor hub module 208 and then distributed to any component coupled to the communications bus 212. In this way, the electrical device (e.g., mechanical interlock, etc.) having the architecture 200 may operate as an intelligent device by interconnecting constituent components of the device and connecting the constituent components to a remote device, a remote device, the Internet, or a cloud service or platform. In turn, the connectivity provided by the architecture 200 may provide improved monitoring and maintenance of the electrical device (e.g., mechanical interlock, etc.) or any constituent component thereof.

The operational status of the electrical device (e.g., mechanical interlock, etc.) or any component thereof may also be indicated locally using light emitting diodes (LEDs) 214. The LEDs 214 may be, for example, positioned on an outer portion of an enclosure of the electrical device (e.g., mechanical interlock, etc.). The LEDs 214 may be operated to indicate an operation status of the electrical device (e.g., mechanical interlock, etc.) or any constituent component thereof.

The architecture 200 may optionally include a liquid crystal display (LCD) module 216 (shown in phantom in FIG. 2). The LCD module 216 may display visual information such as information regarding the operational status of the electrical device (e.g., mechanical interlock, etc.) or any constituent component thereof. The LCD module 216 may include a touchscreen or a touch-sensitive display. Accordingly, the LCD module 216 may provide visual information and/or may receive an input from a user.

The architecture 200 provides an easily scalable and upgradable means to interconnect constituent components to the sensor hub module 208. A first additional sensor module 218 and a second additional sensor module 220 are shown in phantom to indicate the ability to upgrade or scale the architecture 200 to meet the needs of the user. The first and second additional sensors 218 and 220 may be easily added to the communications bus 212 to facilitate interconnectivity with the sensor hub module 208 without the need to add new or separate wiring or to implement additional communication technologies. In general, the architecture 200 allows for any number of components (e.g., sensors, displays, circuits, etc.) to be coupled to the communications bus 212. For example, multiple sensors of the same type (e.g., two or more temperature, humidity, or moisture sensors) may be coupled to the communications bus 212 and configured to communicate with the sensor hub module 208. Further, a variety of different types of sensors beyond those illustrated in FIG. 2 may be coupled to the communications bus 212 and configured to communicate with the sensor hub module 208 including, for example, a pressure sensor, a vibrational sensor, a sound sensor, a thermal array sensor or array or sensors, or a magnetic sensor. In this manner, the architecture 200 may provide a universal, safe, and reduced wiring approach to connecting devices in an industrial application that may be modularly expanded to meet needs for any application.

Figure 3:
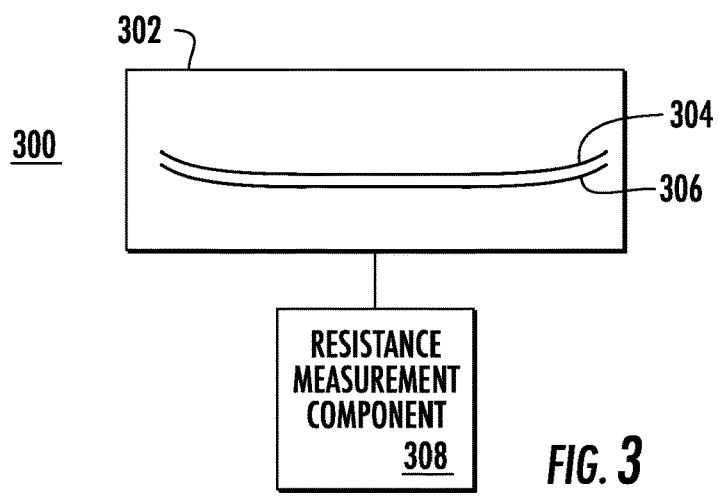
FIG. 3 illustrates an example embodiment of a water detection sensor in accordance with one aspect of the present disclosure.

FIG. 3 illustrates an example embodiment of a water or moisture detection sensor 300. The water detection sensor 300 may be an implementation of the moisture sensor module 206. The water detection sensor 300 may detect the accumulation of water inside enclosures containing high voltage circuits or wiring such as, for example, an electrical device (e.g., a mechanical interlock, etc.). The water detection sensor 300 may provide an alert or alarm if an amount of water inside of the enclosure exceeds a predetermined level, thereby enabling action to be taken to reduce the likelihood of compromised safety or equipment failure.

As shown in FIG. 3, the water detection sensor 300 may be provided within or on a component 302. In one embodiment, the component 302 may be an enclosure or housing such that the water detection sensor 300 is provided within the enclosure (e.g., on a surface of the enclosure). In an alternative embodiment, the component 302 may be a PCB such that the water detection sensor 300 is provided on the PCB which may be mounted inside of an industrial device. In one embodiment, the water detection sensor 300 may be provided within a device that is mounted on a wall with the water detection sensor 300 oriented either vertically or horizontally (as shown in FIG. 3, the water detection sensor may be in a horizontal configuration).

As further shown in FIG. 3, the water detection sensor 300 may also include a first conductive trace 304 and a second conductive trace 306. The first and second conductive traces 304 and 306 may be spaced apart by a fixed amount or distance. The first and second conductive traces 304 and 306 may be electrically coupled to a resistance measurement component 308 (or resistance detection component 308). The resistance measurement component 308 may detect or measure a resistance between the first and second conductive traces 304 and 306.

When an amount of water bridges the gap separating the first and second conductive traces 304 and 306 (e.g., when the amount of water contacts both the first and second conductive traces 304 and 306), the resistance between the first and second conductive traces 304 and 306 may change in comparison to a resistance between the first and second conductive traces 304 and 306 when no water is present. For example, when no water is present, a first resistance value or level between the first and second conductive traces 304 and 306 may be detected by the resistance measurement component 308. When water is present in an amount that fills the gap between the first and second conductive traces 304 and 306, a second, different resistance value or level between the first and second conductive traces 304 and 306 may be detected by the resistance measurement component 308.

In one embodiment, when water is positioned between and coupled to both the first and second conductive traces 304 and 306, the water may provide a short circuit connection between the first and second conductive traces 304 and 306. The resistance measurement component 308 may detect the corresponding change in the resistance between the first and second conductive traces 304 and 306—for example, the between the first and second conductive traces 304 and 306 may detect when the first and second conductive traces 304 and 306 are shorted together.

When a change in resistance between the first and second conductive traces 304 and 306 is detected by the resistance measurement component 308, the resistance measurement component 308 may generate and transmit a signal indicating that water inside of an enclosure in which the water detection sensor 300 is positioned has exceeded a predetermined level. The signal may be an alarm signal and may be transmitted over any type of communication link including, for example, a wired or wireless communication link. In one embodiment, the water detection sensor 300 may include or may be coupled to one or more LEDs that may provide a visual alarm regarding the detection of water that exceeds a predetermined level.

The predetermined level or threshold of the water detection sensor 300 may be primarily determined by a distance between the first and second conductive traces 304 and 306 and a surface of the component 302 where water may accumulate. In one embodiment, water may accumulate on a bottom surface of the component 302. As the distance between the first and second conductive traces 304 and 306 and the bottom surface of the component 302 is increased, more water may be required to bridge the distance between the first and second conductive traces 304 and 306 to cause a change in resistance that may be detected by the resistance measurement component 308. As the distance between the first and second conductive traces 304 and 306 and the bottom surface of the component 302 is decreased, less water may be required to bridge the distance between the first and second conductive traces 304 and 306 to cause a change in resistance that may be detected by the resistance measurement component 308.

The fixed distance between the first and second conductive traces 304 and 306 may also contribute to the determination of the predetermined level or threshold of the water detection sensor 300. For example, the fixed distance between the first and second conductive traces 304 and 306 may determine how much additional water, beyond an initial amount of water that reaches the second conductive trace 306 from the bottom surface of the component 306, may be needed to then reach the first conductive trace 304, thereby causing the first and second conductive traces 304 and 306 to be coupled together. The fixed distance may be set to be large enough to prevent a receding level of water from coupling the first and second conductive traces 304 and 306 together. In one embodiment, the fixed distance can be larger than a drop of water, thereby preventing the water sensor 300 from erroneously determining that the water level has reached the predetermined threshold after the actual water level has dropped.

In one embodiment, the distance between the first and second conductive traces 304 and 306 may be uniform across the lengths of the first and second conductive traces 304 and 306. The distance between the first and second conductive traces 304 and 306 may be set based on a particular application in which the water detection sensor 300 is used.

As shown in FIG. 3, the first and second traces 304 and 306 are each curved. The first and second traces 304 and 306 may be curved by the same amount such that the spacing between the first and second conductive traces 304 and 306 is constant. The curvature of the first and second conductive traces 304 and 306 may compensate for any unintended tilt of the enclosure in which the water detection sensor 300 is positioned. Often, enclosures containing high voltage circuits or wiring may be mounted on a wall and may not be exactly level and instead may have a slight tilt—with the slight tilt corresponding to a relatively small angle as measured from a straight horizontal line for example.

The curvature of the first and second traces 304 and 306 may accommodate for the slight tilt while ensuring that the amount of water that triggers an alarm by the resistance measurement component 308 remains the same. That is, the amount of water required to bridge the gap between the first and second traces 304 and 306 will remain the same whether the enclosure in which the water detection sensor 300 operates is mounted exactly level or with the slight tilt. Absent the curvature of the first and second traces 304 and 306, the slight tilt could trigger an alarm when the amount of water is below the predetermined threshold level, thereby resulting in a false alarm.

Figure 4:
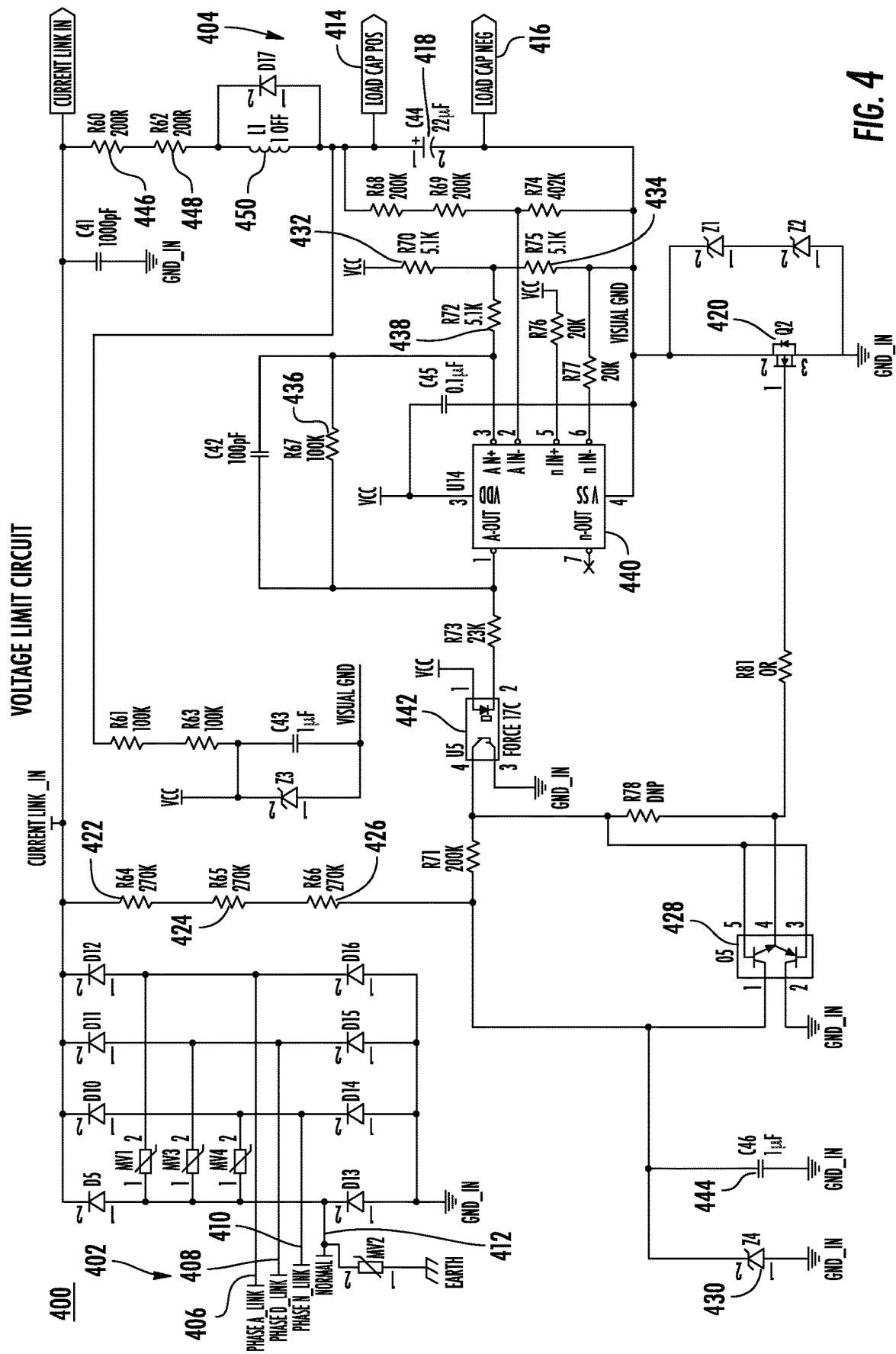
FIG. 4 illustrates an example embodiment of a voltage limiter circuit in accordance with one aspect of the present disclosure.

FIG. 4 illustrates an example embodiment of a voltage limiter circuit 400. The voltage limiter circuit 400 may be a component of an electrical device (e.g., a mechanical interlock, etc.) as described herein including, for example, an electrical device that includes the architecture 200. Alternatively, the voltage limiter circuit 400 may be coupled to an electrical device (e.g., a mechanical interlock, etc.) or may be provided in another device operating in an industrial environment. The voltage limiter circuit 400 may be a power interface that may provide a limited and rectified DC output voltage based on a high voltage AC input voltage. The DC output voltage may be set to not exceed a maximum value.

In one embodiment, the DC output voltage may be set not to exceed 250 V. In one embodiment, the high voltage AC input may be 600 VAC or lower. In one embodiment, the voltage limiter circuit 400 may operate from a single-phase AC input, a two-phase AC input, or a three-phase AC input, with or without a neutral input, from 120 VAC to 660 VAC. In one embodiment, the voltage limiter circuit may provide a limited DC output voltage of 250 VDC, +/−10%.

The voltage limiter circuit 400 may provide the limited DC output voltage based on a 3 phase Wye (Y) input or a 3 phase Delta input. In one embodiment, the voltage limiter circuit 400 may pass through (e.g., with rectification) an input voltage that is less than 250 VAC and may limit the output to 250 VDC when the input exceeds 250 VAC.

The output of the voltage limiter circuit 400 may be provided to an industrial device. As such, the output of the voltage limiter circuit 400 may be considered a supply voltage. The output of the voltage limiter circuit 400 may be further stepped down or dropped to provide a lower DC supply voltage if desired using common circuit connections and/or arrangements as will be appreciated by one of ordinary skill in the art.

The voltage limiter circuit 400 provides a limited and rectified supply voltage from a high voltage input when provided any one of a combination of different 3 phase input connections. This allows the voltage limiter circuit 400 to have broad application in industrial applications when a lower DC supply voltage may be needed and the source input voltage is high voltage AC.

FIG. 4 provides a schematic of the voltage limiter circuit 400. For clarity, a portion of the constituent components of the voltage limiter circuit 400 are labeled for purposes of discussion to describe the operation of the voltage limiter circuit 400. As shown in FIG. 4, the voltage limiter circuit includes an input interface 402 and an output interface 404. The input interface 402 may include a first phase input 406, a second phase input 408, a third phase input 410, and a neutral input 412. The voltage limiter circuit 400 may operate when any one of the three inputs 406, 408, and 410 are provided, with or without the neutral input 412.

In accordance with one aspect of the present disclosure, the voltage limiter circuit 400 may be used in combination with either a three-phase Wye input configuration or a three-phase Delta input configuration. That is, the voltage limiter circuit 400 is universal and may be selectively used with a three-phase Wye configuration and a three-phase Delta configuration without any additional customization. This is in contrast to known competitor devices.

The output interface 404 may include a first output connection 414 and a second output connection 416. The first and second output connections 414 and 416 may be provided across an output capacitor 418. The voltage provided across the first and second output connections 414 and 416 (and across the output capacitor 418) may be the output voltage of the voltage limiter circuit 400 and may be the desired DC output voltage. As described herein, the desired DC output voltage may be set based on selection of constituent components of the voltage limiter circuit 400. Further, as described herein, the desired DC output voltage may be a set to not exceed a maximum voltage such as, for example, 250 V DC.

The following is a description of exemplary operation of the voltage limiter circuit 400. During initial startup, a switching field-effect transistor (FET) 420 may be turned on by series resistors 422, 424, and 426 which may drive the common base of transistor arrangement 428. A gate voltage of transistor 420 may be limited by Zener diode 430. An output voltage provided across the capacitor 418 may increase until the output voltage reaches a threshold level (e.g., 250 V) set by a voltage divider formed by resistor 432 and resistor 434 and hysteresis resistors 436 and 438.

When the output voltage across the capacitor 418 reaches the threshold level, an output of a comparator 440 may switch to a low output. In doing do, an optocoupler 442 may be turned on. Further, transistor 420 is turned off with transistor 428 operating as a buffer for transistor 420. The optocoupler 442 may provide isolation and allows the circuit arrangement including the comparator 440 to be referenced to a negative terminal of the capacitor 418, thereby obviating the need for high power resistors.

The transistor arrangement 428 provides a buffer to meet the relatively large turn on and turn off pulses required by the transistor 420 by using charge stored in a capacitor 444. When the transistor 420 is turned off, a load coupled to the first and second output terminals 414 and 418 may operate from charge stored in the capacitor 418, thereby slowly discharging the capacitor 418. When the voltage across the capacitor 418 decreases below the threshold level, the output of the comparator 440 switches off the optocoupler 442. When the optocoupler 442 turns off, the transistor 420 may be turned on, causing the output capacitor 418 to be charged again. In this manner, the cycle of turning on and off the transistor 420 to charge and discharge the capacitor 418 may be repeated to provide the desired DC output voltage Resistors 446 and 448 and inductor 450 may limit current rush into the capacitor 418 when the transistor 420 switches states (e.g., from off to on). This may reduce the likelihood of voltage overshoots across the capacitor 418 while also reducing switching speeds. By ensuring reduced switching speeds, required peak currents may be reduced which allows for the use of lower Zener currents in the voltage limiter circuit 400 for component drive circuits.

The voltage limiter circuit 400, in contrast to conventional limiter circuits, allows the transistor 420 to be switched on and off (e.g., to charge/discharge the capacitor 418) without the need for the input voltage signal to swing positive and negative (e.g., without the need for a zero-crossing of the incoming power signal). In turn, the voltage limiter circuit 400 may operate without the need for high power components, thereby reducing the cost and complexity of the voltage limiter circuit 400 in comparison to conventional approaches for supplying a limited and rectified DC supply voltage in a high voltage industrial environment.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. An electrical device for supplying line-voltage power to a downstream coupled device, comprising:
   a communications bus;
   a sensor module coupled to the communications bus; and
   a sensor hub module coupled to the communications bus, wherein the sensor module generates a signal including data indicating a sensed condition, wherein the sensor module transmits the generated signal to the sensor hub module over the communications bus, and wherein the sensor hub module controls operation of the sensor module based on the data indicating the sensed condition provided in the generated signal.

2. The electrical device of claim 1, wherein the sensor hub module receives and processes the generated signal from the sensor module.

3. The electrical device of claim 2, wherein the sensor hub module analyzes the data indicating the sensed condition provided in the generated signal and, based thereon, controls the operation of the sensor module.

4. The electrical device of claim 2, further comprising a communications module coupled to the sensor hub module.

5. The electrical device of claim 4, wherein the sensor hub module transmits the data indicating the sensed condition to the communications module.

6. The electrical device of claim 5, wherein the communications module transmits the data indicating the sensed condition to at least one of a remote device, a remote computer network, and a remote cloud service.

7. The electrical device of claim 4, wherein the sensor hub module receives a remote signal from at least one of a remote device, a remote computer network, and a remote cloud service through the communications module.

8. The electrical device of claim 7, wherein the sensor hub module controls the operation of the sensor module based on the received remote signal.

9. The electrical device of claim 1, wherein the communications bus is an Inter-Integrated Circuit (I2C) bus.

10. The electrical device of claim 1, wherein the sensor module is one of a power sensor module, a temperature sensor module, and a moisture sensor module.

11. The electrical device of claim 1, wherein the sensor module is one of a humidity sensor module, a pressure sensor module, a vibrational sensor module, a sound sensor module, a thermal array sensor module, and a magnetic sensor module.

12. The electrical device of claim 1, further comprising one of one or more light emitting diodes (LEDs) and a liquid crystal display (LCD), the one or more LEDs or LCD being arranged and configured to indicate an operational state of the electrical device.

13. The electrical device of claim 1, wherein the electrical device is configured to operate in one of a three-phase Wye configuration and a three-phase Delta configuration.

14. The electrical device of claim 1, further comprising a plurality of additional sensor modules, wherein at least two of the plurality of additional sensor modules are sensor modules of the same type.

15. The electrical device of claim 1, wherein the sensor module comprises a water detection sensor, comprising:
   a first curved conductive trace; and
   a second curved conductive trace.

16. The electrical device of claim 15, wherein the water detection sensor further comprises a resistance detection component coupled to the first and second curved conductive traces, the resistance detection component being arranged and configured to detect a change in a resistance value between the first and second curved conductive traces.

17. The electrical device of claim 16, wherein a predetermined amount of water connects the first curved conductive trace to the second curved conductive trace, thereby changing the resistance value between the first and second curved conductive traces.

18. The electrical device of claim 17, wherein the resistance detection component generates a signal indicating the detected change in resistance value between the first and second curved conductive traces.

19. The electrical device of claim 18, wherein the resistance detection component transmits the generated signal to at least one of a remote device, a remote network, and a remote cloud service.

20. The electrical device of claim 19, wherein the water detection sensor further comprises one or more light emitting diodes (LEDs), the generated signal controlling the LEDs to correspond to the detected change in resistance value between the first and second curved conductive traces.

21. The electrical device of claim 17, wherein the predetermined amount of water is based on a fixed uniform distance between the first and second curved conductive traces.

22. The electrical device of claim 21, wherein the predetermined amount of water is further based on a distance between a surface accumulating water and the first and second curved conductive traces.

23. The electrical device of claim 1, further comprising a voltage limiter circuit comprising:
    an input interface coupled to an AC input voltage;
    an output interface including an output capacitor coupled between a first output connection and second output connection; and
    a switching transistor coupled to the output capacitor, wherein the switching transistor turns on to charge the output capacitor to a threshold voltage level and turns off when the output capacitor is charged above the threshold voltage level, wherein the threshold voltage level corresponds to a DC output voltage.

24. The electrical device of claim 23, wherein the DC output voltage is equal to or less than a maximum output voltage.

25. The electrical device of claim 23, wherein the input interface comprises one of a single-phase input, a two-phase input, and a three-phase input.

26. The electrical device of claim 25, wherein the input interface comprises a neutral input.

27. The electrical device of claim 25, wherein the input interface comprises one of a three-phase Wye configuration and a three-phase Delta configuration.

* * * * *